(12) United States Patent
Sewell

(10) Patent No.: US 12,145,696 B2
(45) Date of Patent: Nov. 19, 2024

(54) WATERCRAFT

(71) Applicant: Dillinger Pty Ltd, Arundel (AU)

(72) Inventor: Sam Sewell, Southport (AU)

(73) Assignee: Dillinger Pty Ltd, Arundel (AU)

( * ) Notice: Subject to any disclaimer, the term of this patent is extended or adjusted under 35 U.S.C. 154(b) by 465 days.

(21) Appl. No.: 17/616,972

(22) PCT Filed: Apr. 3, 2020

(86) PCT No.: PCT/AU2020/050329
§ 371 (c)(1),
(2) Date: Dec. 6, 2021

(87) PCT Pub. No.: WO2020/243769
PCT Pub. Date: Dec. 10, 2020

(65) Prior Publication Data
US 2022/0315174 A1 Oct. 6, 2022

(30) Foreign Application Priority Data

Jun. 7, 2019 (AU) .................................. 2019901986

(51) Int. Cl.
*B63B 32/10* (2020.01)
*B63B 1/24* (2020.01)
(Continued)

(52) U.S. Cl.
CPC ............ *B63B 32/10* (2020.02); *B63B 1/246* (2013.01); *B63B 1/248* (2013.01); *B63B 1/28* (2013.01);
(Continued)

(58) Field of Classification Search
None
See application file for complete search history.

(56) References Cited

U.S. PATENT DOCUMENTS

| 2019/0367132 A1* | 12/2019 | Montague | B63H 21/17 |
| 2019/0389551 A1* | 12/2019 | Aoki | B63H 11/08 |
| 2020/0189691 A1* | 6/2020 | Trewern | B63B 32/10 |

FOREIGN PATENT DOCUMENTS

| AU | 2017268537 B1 * | 7/2018 | ............ B63B 1/246 |
| EP | 3453605 A1 * | 3/2019 | ............ B63B 1/246 |

(Continued)

OTHER PUBLICATIONS

International Search Report mailed Jun. 23, 2020 for International Application No. PCT/AU2020/050329.
(Continued)

*Primary Examiner* — S. Joseph Morano
*Assistant Examiner* — Jovon E Hayes
(74) *Attorney, Agent, or Firm* — Lippes Mathias LLP

(57) ABSTRACT

A watercraft (10) including a board (12), a mast (16) extending below the board, (12) the mast (16) carrying a foil (20) and a propeller (30) that is driven by a motor (32), the motor (32) being carried in a tube (18) connected to or extending from the mast (16), wherein a motor controller (34) is also positioned within the tube (18). In this manner, heat generated by the motor controller during use is dissipated into the water through which the watercraft is travelling. The watercraft (10) may also have a receptacle for holding lubricant, the receptacle being located above the motor, wherein the mast has a conduit that provides fluid communication between the receptacle and the lubricant lubricating the motor and/or driveshaft such that lubricant in the receptacle provides a hydrostatic head of pressure to prevent or minimise water ingress around a propeller seal or a driveshaft seal located adjacent a region where the driveshaft exits into the water.

20 Claims, 15 Drawing Sheets

(51) Int. Cl.
    *B63B 1/28*     (2006.01)
    *B63B 32/60*     (2020.01)
    *B63H 1/28*     (2006.01)
    *B63H 21/17*     (2006.01)
    *B63H 21/21*     (2006.01)
    *B63H 21/38*     (2006.01)

(52) U.S. Cl.
    CPC ............... *B63B 32/60* (2020.02); *B63H 1/28* (2013.01); *B63H 21/17* (2013.01); *B63H 21/21* (2013.01); *B63H 21/386* (2013.01); *B63H 2021/216* (2013.01)

(56) References Cited

FOREIGN PATENT DOCUMENTS

EP       3 581 482 A1    12/2019
WO    WO-2018147386 A1 *  8/2018  ............. B63B 32/10

OTHER PUBLICATIONS

Written Opinion mailed Jun. 23, 2020 for International Application No. PCT/AU2020/050329.
International Preliminary Report on Patentability issued Dec. 7, 2021 for International Application No. PCT/AU2020/050329.

* cited by examiner

WATERCRAFT

TECHNICAL FIELD

The present invention relates to a watercraft. In particular, the present invention relates to a watercraft that can operate in a hydrofoil mode.

BACKGROUND ART

Personal watercraft are becoming more popular for recreational pursuits. Examples of personal watercraft that are in widespread use include surfboards, body boards, stand-up paddle boards, and surf skis. All these types of personal watercraft are non-powered watercraft.

Powered watercraft are also widely used. These include small outboard boats and powered watercraft such as those sold by Kawasaki Motors Australia under the JET SKI trademark.

A relatively recent addition to the powered watercraft products that are available to the public are what could be loosely called foil boards. Such watercraft comprise a board upon which a user can stand or lie. A post or mast extends downwardly below the board. A hydrofoil is located at the lower end of the post or mast. A motor driven propeller can be operated by the user to cause the board to be propelled through the water. At low speeds, the hull of the board is in contact with the water and rides on the water. However, once the speed passes a critical threshold, the action of the hydrofoil causes the board to lift out of the water and the watercraft then moves along as a hydrofoil. In these types of watercraft, the motor is typically electrically powered by a battery and a handheld control unit is operated by the user to control the speed of the motor and hence the speed of the watercraft. The handheld control unit typically communicates wirelessly with a motor controller such that inputs to the handheld control unit made by the user are communicated to the motor controller and the motor controller implements those inputs to control the speed of the motor. One example of a product of this type is sold by Fliteboard Pty Ltd under the name "Fliteboard eFoil".

During use of the hydrofoil board type watercraft described in the paragraph directly above, it has been found that the motor controller tends to get very hot. One effort to address this issue is described in Australian patent number 2017268537. In this patent, an electric motor and hydrofoil is mounted at the lower end of the mast and the upper end of the mast is connected to the underside of the board. A block having control circuitry is mounted to the base of an attachment plate that connects to the mast and this acts as a thermal bridge to dissipate heat into the mast. The control circuitry can be used to either modulate the motor or control the foils. The control circuitry generates heat which can be readily dissipated into the water via the mast, which is preferably formed from a material having high thermal conductivity, such as aluminium.

It will be clearly understood that, if a prior art publication is referred to herein, this reference does not constitute an admission that the publication forms part of the common general knowledge in the art in Australia or in any other country.

SUMMARY OF INVENTION

The present invention is directed to a watercraft, which may at least partially overcome at least one of the above-mentioned disadvantages or provide the consumer with a useful or commercial choice.

With the foregoing in view, the present invention in one form, resides broadly in a watercraft comprising a board, a mast extending below the board, the mast carrying a foil and a propeller that is driven by a motor, the motor being carried in a tube connected to or extending from the mast, wherein a motor controller is also positioned within the tube.

In one embodiment, heat generated by the motor controller during use of the watercraft is transferred to the tube and is dissipated into the water through which the watercraft is travelling.

In one embodiment, the tube comprises a thruster tube having a propeller attached at one end and the thruster tube being connected to the mast at another end. The motor may be mounted in the thruster tube close to the propeller end. The motor controller may be mounted in the thruster tube between the motor and the mast.

In one embodiment, the motor controller is encased in a thermally conductive material and the thermally conductive material is in contact with an inner wall of the thruster tube. This assists in obtaining good thermal contact between the motor controller, the thermally conductive material and the thruster tube.

In one embodiment, the thermally conductive material may comprise a thermally conductive polymer. The thermally conductive polymer may comprise a thermally conductive potting compound. Thermally conductive potting compounds are resins designed to encapsulate components or "pot" the components. The thermally conductive potting compounds can dissipate heat away from electronic components and also offer additional protection from environmental elements such as water.

In one embodiment, the motor controller is encased in the thermally conductive material and the thermally conductive material is shaped such that it can snugly fit inside the thruster tube. In one embodiment, the motor controller is encased in the thermally conductive material and the thermally conductive material is allowed to set. Following that, the thermally conductive material and motor controller can be friction fit inside the thruster tube. This not only assists in retaining the motor controller securely inside the thruster tube, it also forms a watertight seal between the walls of the thruster tube and the thermally conductive material.

In one embodiment, one or more electrical or data leads or cables extend from the motor controller up through the mast. The one or more electrical or data leads or cables may be connected either by wires or wirelessly to a control unit operated by the user of the watercraft. In this manner, control signals from the control unit operated by the user can be transferred through the one or more electrical or data leads or cables extending through the mast to the motor controller.

In one embodiment, the control unit operated by the user of the watercraft transmits signals wirelessly to a wireless receiver and the wireless receiver processes and/or sends those signals via the one or more electrical or data leads or cables to the motor controller.

In one embodiment, the control unit operated by the user comprises a handheld control unit. In one embodiment, the control unit is a wireless control unit that wirelessly communicates with a wireless receiver that then sends control signals to the motor controller.

In one embodiment, the mast is connected to the board. For example, the mast may be directly connected to the board, such as by bolts, screws or the like. In this embodiment, one or more batteries to provide electrical power to the motor may be mounted in a cavity in the board.

In another embodiment, the mast is connected to a housing and the housing is connected to the board. The housing is suitably connected to an underside of the board. In this embodiment, the housing may house one or more batteries. The housing may have a seal between itself and the board when the housing is connected to the board. The housing may comprise a watertight housing having a base, sidewalls and a top.

In on embodiment, the housing connects to a bottom of the board. In another embodiment, the board has a recessed region in a lower surface and the housing is connected to the board in the recessed region. In one embodiment, the housing has a lower surface that follows a line of a lower external surface of the board, such that the lower surface of the housing is essentially flush with a lower external surface of the board. In another embodiment, the housing has a lower surface that is below a lower external surface of the board.

In another embodiment, the watercraft includes one or more batteries, the one or more batteries being recessed into the board. In one embodiment, the one or more batteries are positioned in a recessed region in a lower surface of the board. In one embodiment, the one or more batteries are in a housing and the housing is positioned in a recessed region of the lower surface of the board, as described above. In these embodiments, the one or more batteries sit inline with the major components, forming a structural part of the watercraft.

In one embodiment, the motor is supplied with oil from a sump located towards the top of the housing or at or above the top of the housing. In one embodiment, oil in the sump travels down a first conduit in the mast to the thruster tube and travels up a second conduit in the mast back to the sump. The oil provides both cooling and lubrication to the motor. Further, as there is a hydrostatic head of oil above the motor (due to the positioning of the sump high up in the mast or above the mast), the pressure differential caused by the hydrostatic head of oil assists in eliminating or minimising seawater or ingress past the propeller shaft seal.

In another embodiment, there is no circulation of oil up and down the mast. The oil in the motor section of the thruster tube does circulate in that section due to rotation of the motor. However, the oil in the sump and mast is in fluid communication with the oil in the motor section to provide the hydrostatic head of oil to prevent or minimise water ingress around the propeller seal. It is noted that there may be some circulation of oil that arises from convection circulation.

In another aspect, the present invention provides a watercraft comprising a board, a mast extending below the board, the mast carrying a foil and a propeller that is driven by a motor, a lubricant lubricating the motor and/or a drive shaft associated with the motor for driving the propeller, the watercraft having a receptacle for holding lubricant, the receptacle being located above the motor, wherein the mast has a conduit that provides fluid communication between the receptacle and the lubricant lubricating the motor and/or driveshaft such that lubricant in the receptacle provides a hydrostatic head of pressure to prevent or minimise water ingress around a propeller seal or a driveshaft seal located adjacent a region where the driveshaft exits into the water.

In one embodiment, the foil comprises a lifting foil and a stabilising foil. The lifting foil may be a front foil and the stabilising foil may be a rear foil. The lifting foil may be larger than the stabilising foil.

In one embodiment, the mast has one or more conduits through which cables and/or wires can pass and through which oil can pass. This allows for the motor controller to be connected to electronics located at or near the top of the mast or at or near the board and it also reduces the weight of the mast by virtue of the mast including one or more hollow conduits.

The present invention also relates to an apparatus for retrofitting to a board to convert the board into a powered hydrofoil watercraft, the apparatus comprising a mast carrying a foil and a propeller that is driven by a motor, the motor being carried in a tube connected to or extending from the mast, the foil and the tube being located at or towards a lower end of the mast, and a housing located at an upper end of the mast, the housing carrying one or more batteries for providing electrical power to the motor, wherein the housing is connectable by fasteners to the board.

In one embodiment, the housing has an upper profile that fits against an underside of the board. In another embodiment, an upper part of the housing is made from a conformable or flexible material that can adapt shaped to fit against an underside of the board. The conformable or flexible material may comprise a flexible and resilient material. The material may comprise a resilient and flexible foam or a rubber material or an elastomeric material. When the apparatus is connected to the board, the conformable or flexible material is pressed to the board so that the upper part thereof adapts to the shape of the board.

In another embodiment, the housing has a top that closes at least part of the housing. For example, the top may completely close a battery compartment in the housing such that the battery or batteries are protected against water ingress by the housing. It will be appreciated that electrical power cables may extend through at least one of the walls of the battery compartment so that battery power can be supplied to the motor and motor controller.

In one embodiment, the apparatus of the second aspect of the present invention further includes a bracket that is connected to one or more slots formed in the board, the bracket receiving fasteners that fasten the apparatus to the bracket to thereby fasten the apparatus to the board. In one embodiment, the slots on the board comprise slots adapted to receive one or more fins. The slots may comprise conventional slots that are commonly formed on a number of boards, such as stand-up paddle boards or surfboards.

In one embodiment, the bracket extends below an underside of the board and the bracket fits into a recess in an upper part of the housing so that a top of the housing can be in close fit with the underside of the board.

In one embodiment, the housing is of a streamlined shape that minimises hydrodynamic drag during operation of the board at lower speed when the hull of the board is in the water. It will be appreciated that when the board is operating in a hydrofoil mode, the board will lift up and the housing will be located out of the water. Therefore, the housing will not cause any hydrodynamic drag when the board is foiling.

The apparatus of the second aspect of the present invention may include other features as described with reference to the first aspect of the present invention. For brevity of description, further description of those features as they are included in the second aspect of the present invention will not be provided, except to say that in one embodiment of the apparatus of the second aspect of the present invention, the motor controller is also located in the tube that houses the motor that drives the propeller.

The apparatus of the second aspect of the present invention can be retrofitted to an existing non-powered board, such as stand-up paddle board, a surfboard or a windsurfing board, to convert the poured into a powered hydrofoil board.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

In FIG. 3, part of the board has been shown as transparent so that some of the underlying structure can be more easily seen;

DESCRIPTION OF EMBODIMENTS

It will be appreciated that the drawings have been provided for the purposes of illustrating preferred embodiments of the present invention. Therefore, it will be understood that the present invention should not be considered to be limited solely to the features as shown in the attached drawings.

The watercraft 10 shown in the attached drawing comprises a board 12. In the embodiment shown in the attached drawings, the board 12 is a stand-up paddle board. The board 12 may be specifically designed for use in the watercraft of the present invention. Alternatively, it may be a conventional stand-up paddle board to which the housing, mast, propeller and foil are attached, such as by a retrofit as will be described hereunder.

Figure 1:
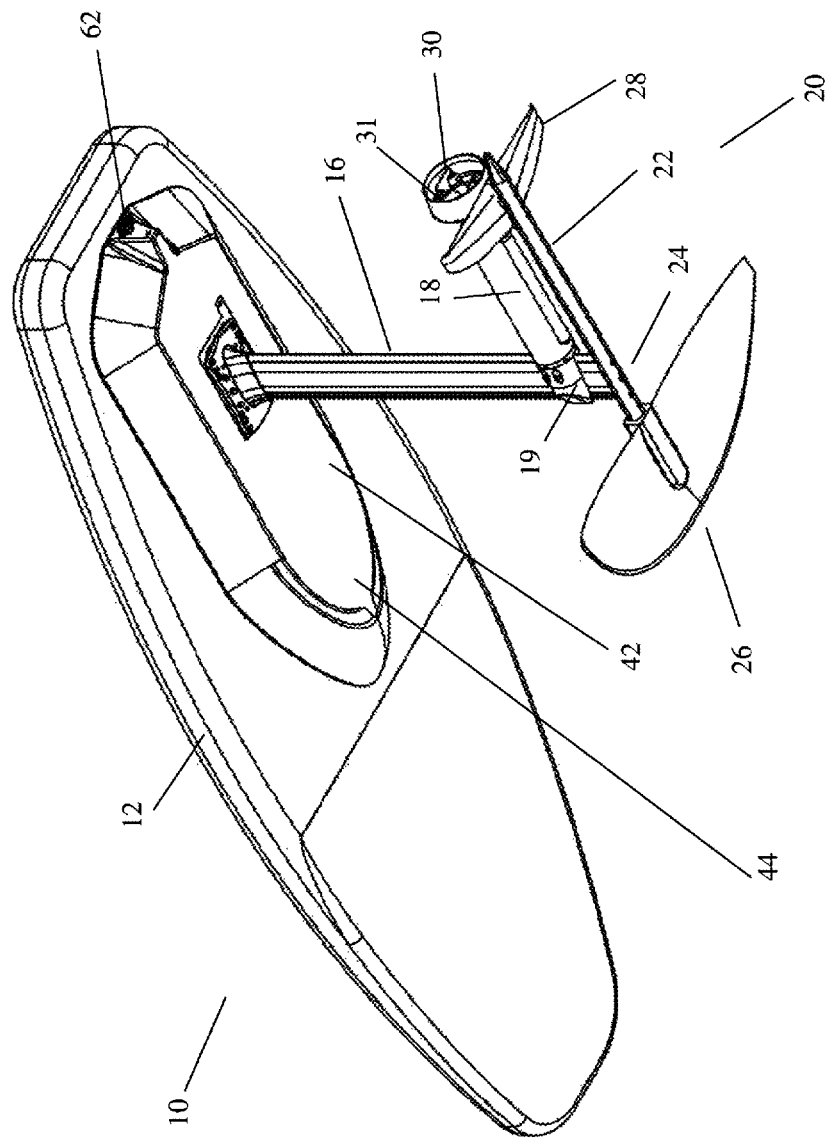
FIG. 1 shows a perspective view from underneath of a watercraft in accordance with an embodiment of the present invention.

The watercraft 10 shown in the attached drawings is a powered hydrofoil watercraft. To achieve this, a housing 14 is attached to the underside of the board 12. The attachment method will be described in more detail hereunder. A mast 16 extends downwardly from the housing 14. The mast 16 may be removably connected to the housing 14. The mast 16 is suitably of a low drag hydrodynamic design and made from a lightweight and strong material, such as aluminium or marine grade stainless steel. As can be seen from FIG. 1, the top part of the mast 16 is attached to the housing 14.

A thruster tube 18 is connected to the mast 16 near the lower end of mast 16. A foil arrangement 20 is connected to the bottom of the mast 16. The foil arrangement 20 includes a foil bar 22 that is connected via bolts 24 to the lower end of the mast 16. The foil bar 22 carries a lifting foil 26 at its front end and a stabilising foil 28 at or near its rear end. The lifting foil 26 provides lift that is sufficient to raise the board 12 out of the water when a minimum threshold speed is reached whilst stabilising foil 28 provides for a more stable ride when the board is hydrofoiling.

The thrust tube 18 has a propeller 30 attached at or near one end thereof. The propeller 30 is surrounded by a propeller shroud 31. A propeller shaft 33 connects the propeller to a motor 32. When the motor is energised, it spins which causes the drive shaft to rotate which, in turn, causes the propeller to rotate. A propeller shaft seal forms a seal between the propeller drive shaft and the outlet of the thruster tube 18. This prevents water ingress into the thruster tube and motor and also prevents lubricating oil from leaking out of the thruster tube. It will be appreciated that the thruster tube 18 is a hollow tube that will typically made from a metal, such as aluminium.

Figure 2:
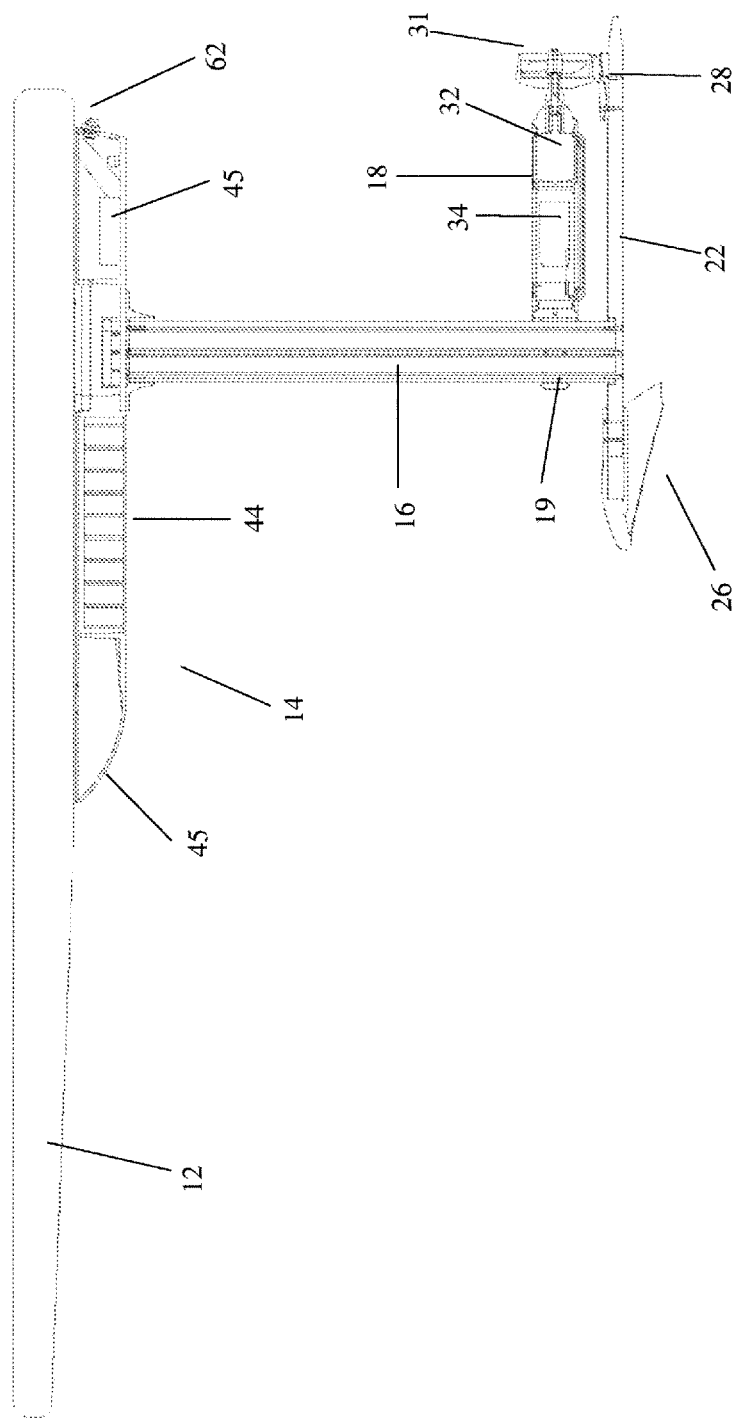
FIG. 2 shows a side view of the watercraft shown in FIG. 1.
Figure 3:
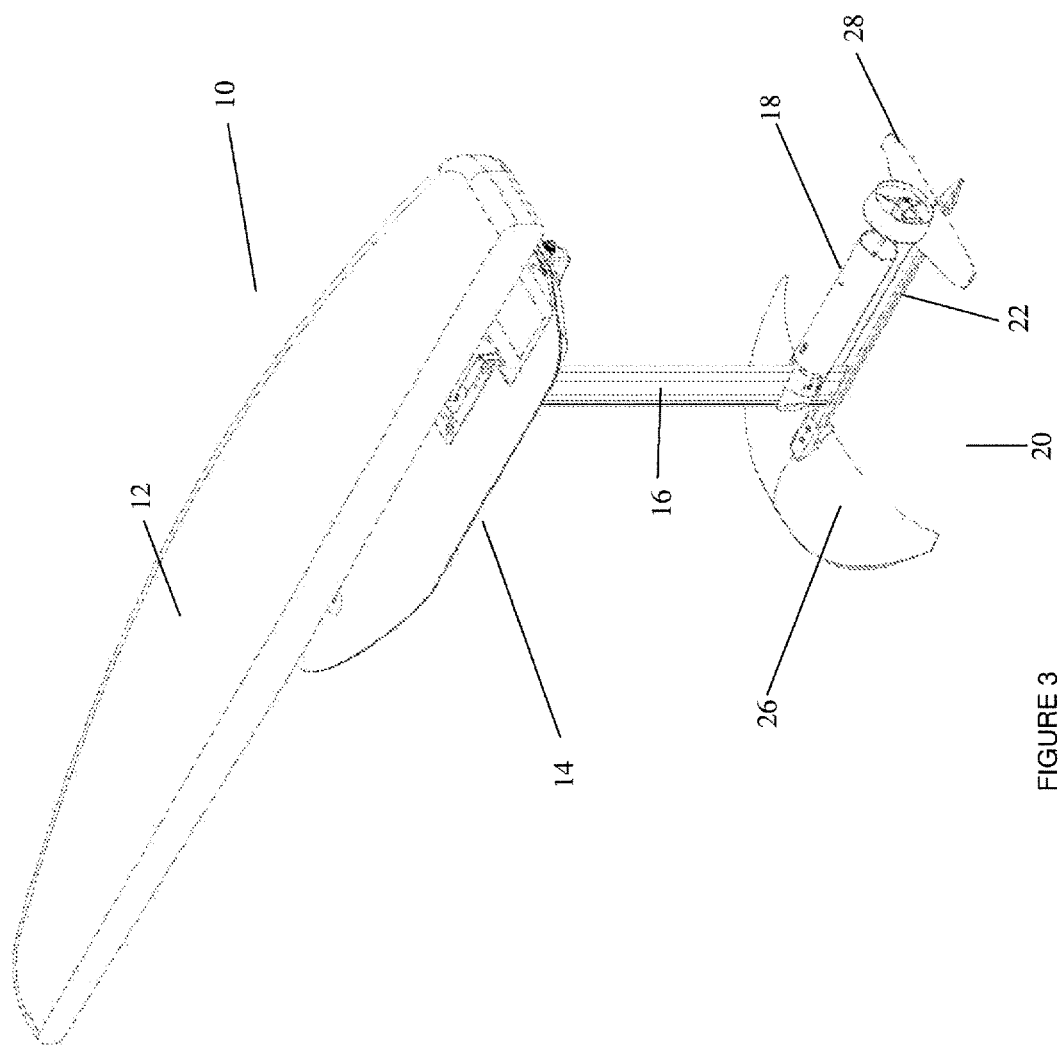
FIG. 3 shows a perspective view from above of the watercraft shown in FIG. 1.

A motor controller 34 is also mounted within the thruster tube 18. As can be seen from FIG. 2, the motor controller 34 is positioned between the motor 32 and the forward end of the thruster tube 18 that is connected to the mast 16. The motor controller 34 has electrical leads connected thereto. These electrical leads may be connected to electrical cables extending through conduits in the mast 16 to thereby receive electrical power from batteries located in the housing 14. The motor controller contains any necessary transformers that may be required to provide the correct voltage and/or current to the motor 32. The motor controller 34 also includes electronics that control operation of the motor. The construction of the motor controller 34 may be of conventional construction and the skilled person would readily understand that there are numerous motor controls available for purchase from various suppliers.

The motor control and 34 is mounted in the thruster tube 18 such that heat generated by the motor controller 34 is transferred to the thruster tube 18. In the embodiment shown in the attached drawings, the motor controller 34 is encased in a thermally conductive potting compound. Such thermally conductive potting compounds are well known to person skilled in the art and are readily commercially available. In one embodiment, the motor controller 34 is positioned inside a cylindrical mould and the potting compound is poured into the mould such that it encases the motor controller whilst leaving the electrical leads for the motor controller exposed. The potting compound is allowed to set and harden and it is then removed from the mould. At this stage, the motor controller 34 is encased in a cylindrical block of hardened or set potting compound. The diameter of that cylindrical block is approximately the same as the inner diameter of the thruster tube 18, which ensures that the cylindrical block can be mounted inside the thruster tube 18 in a friction fit to thereby securely retain the cylindrical block and the motor controller 34 inside the thruster tube 18. (An alternative method for mounting the motor controller 34 in the potting compound will be described below). Appropriate electrical connections and oil conduit connections can then be made between the thruster tube 18 and the mast 16 and the forward end 19 of the thruster tube 18 can then be connected to the mast 16, for example, by bolts. This securely mounts the thruster tube 18 and of the components carried by the thruster tube 18 to the mast 16.

Figure 5:
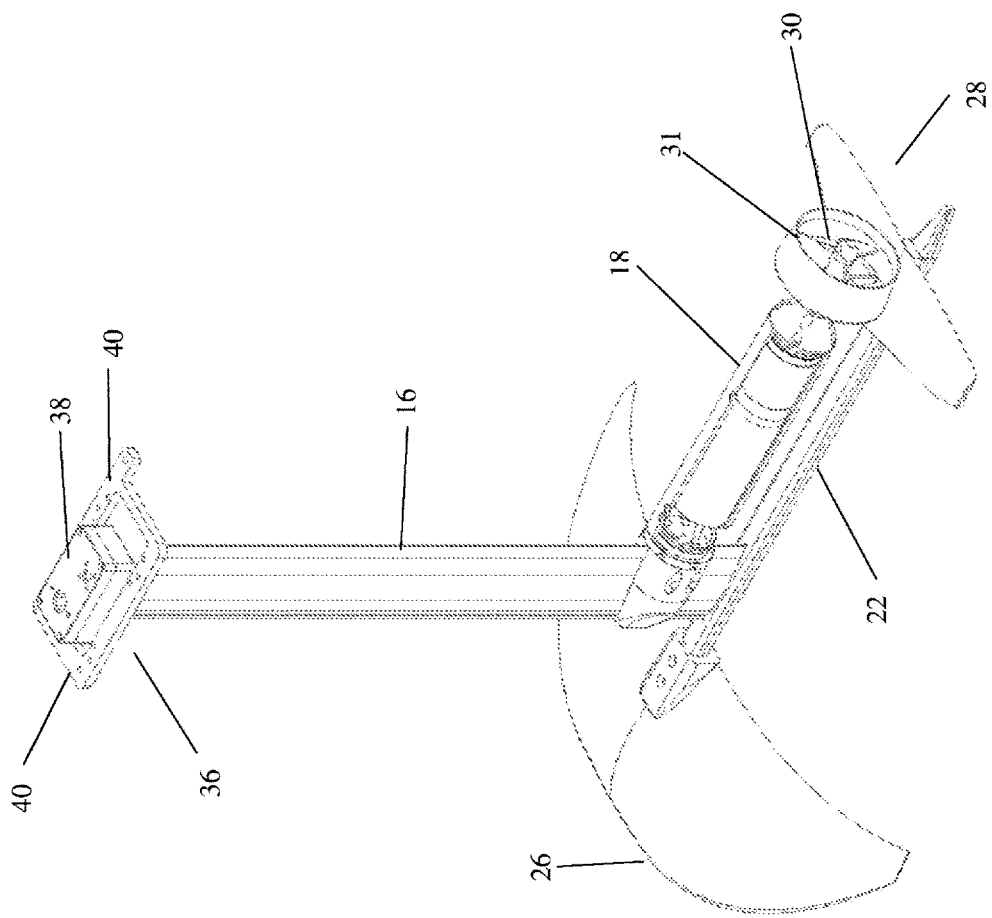
FIG. 5 shows a perspective view of a mast having a thruster tube and foil attached thereto, for use in embodiments of the present invention.
Figure 6:
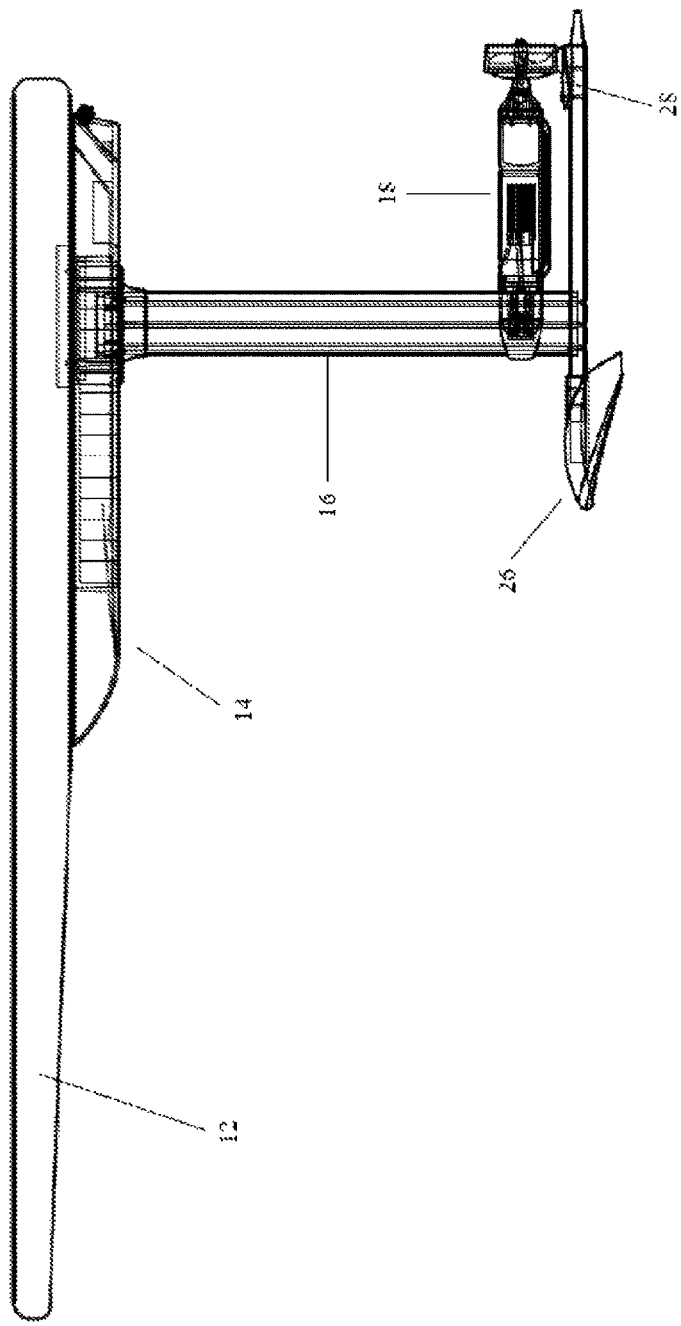
FIG. 6 shows a side view, partly in cross-section, of the apparatus shown in FIG. 1.
Figure 7:
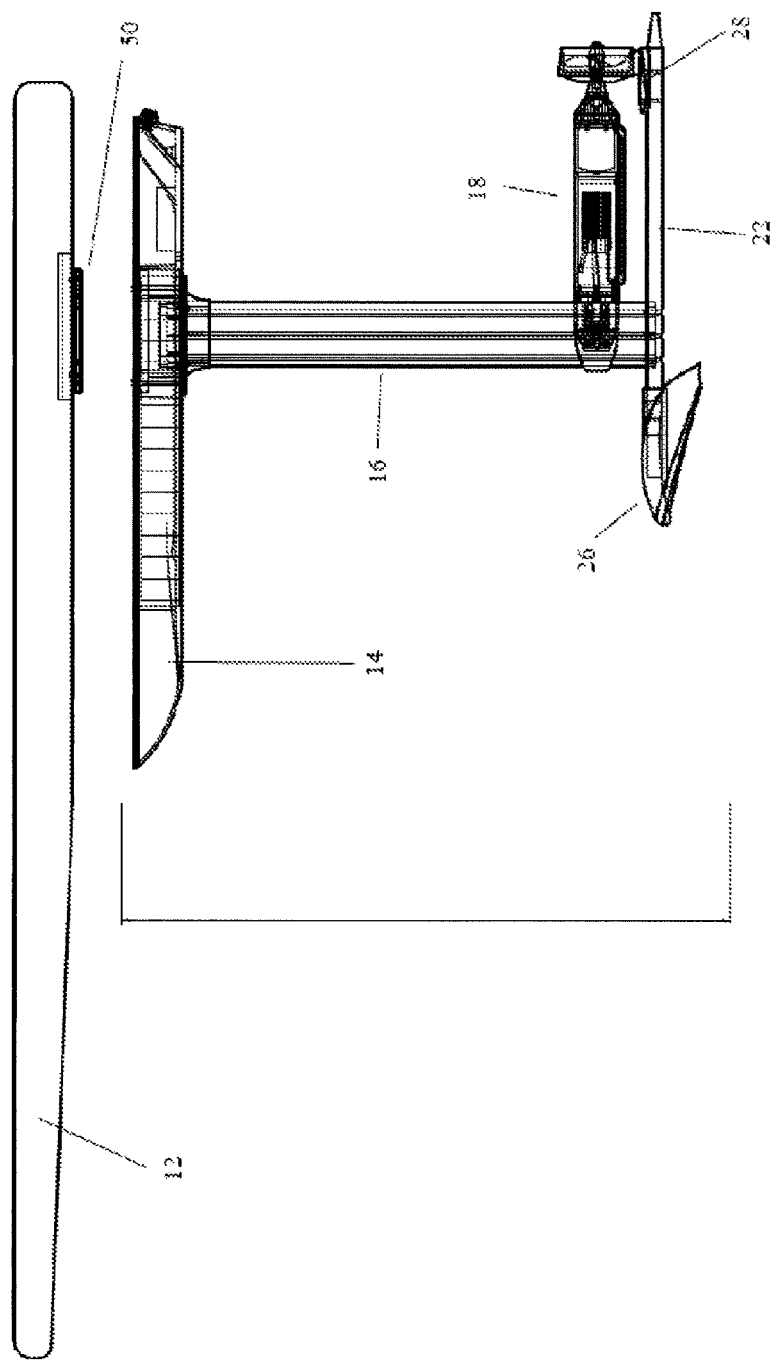
FIG. 7 shows a side view of the apparatus shown in FIG. 1, but with the mast and housing being separated from the board.

Turning now to FIG. 5, the upper end of mast 16 is provided with a plate 36. Plate 36 carries a wireless receiver and other electronics 38. As can be seen from FIG. 5, the plate 36 has a larger footprint dimension than the wireless receiver 38. Plate 36 is provided with a plurality of apertures, some of which are numbered at 40. Apertures 40 allow bolts to be passed therethrough to enable the plate 36 to be connected to the housing 14 and to the board 12, as will be described in more detail hereunder.

Figure 4:
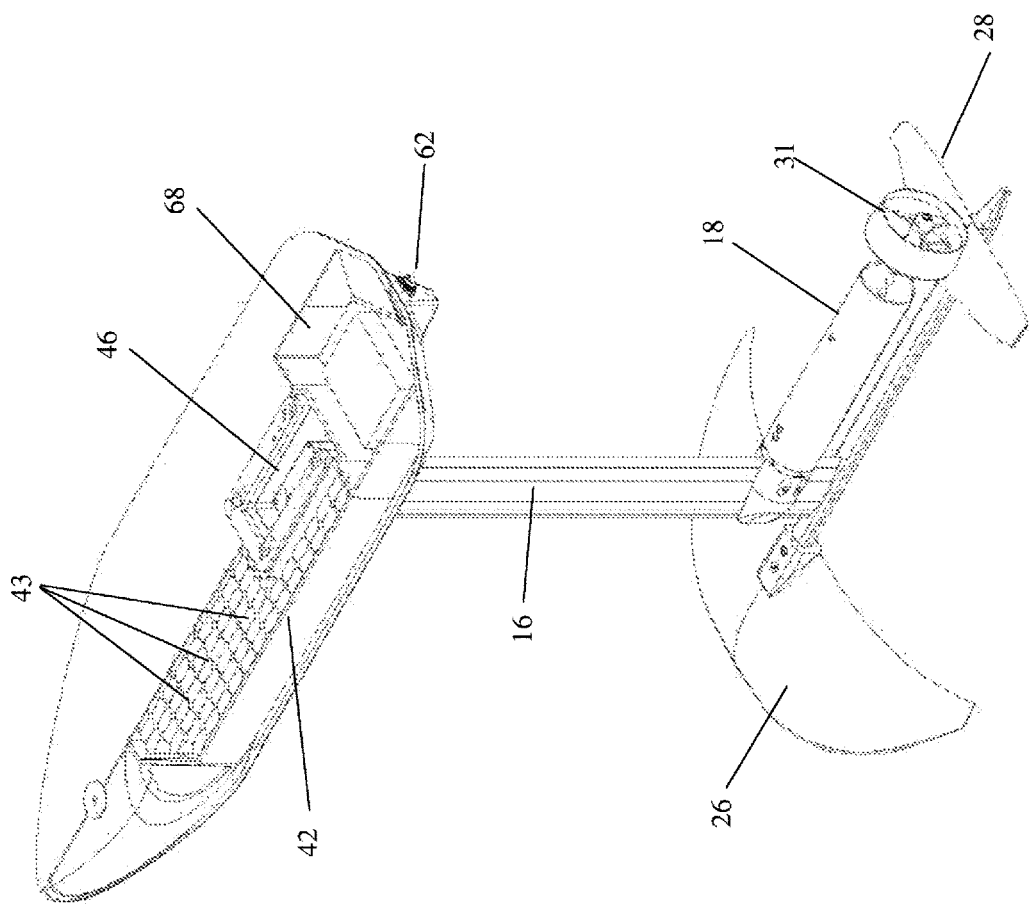
FIG. 4 is a perspective view from above of an embodiment of an apparatus in accordance with an embodiment of the present invention for fitting to a board. The apparatus of FIG. 4 can be retrofitted to the board.

The housing 14 includes a battery compartment 42 that houses a plurality of batteries, some of which are numbered at 43 (see FIG. 4). The housing 14 has a bottom 44 and sidewalls 45. As can be seen from FIG. 1, the housing 14 is shaped to provide relatively low hydrodynamic drag.

Figure 13:
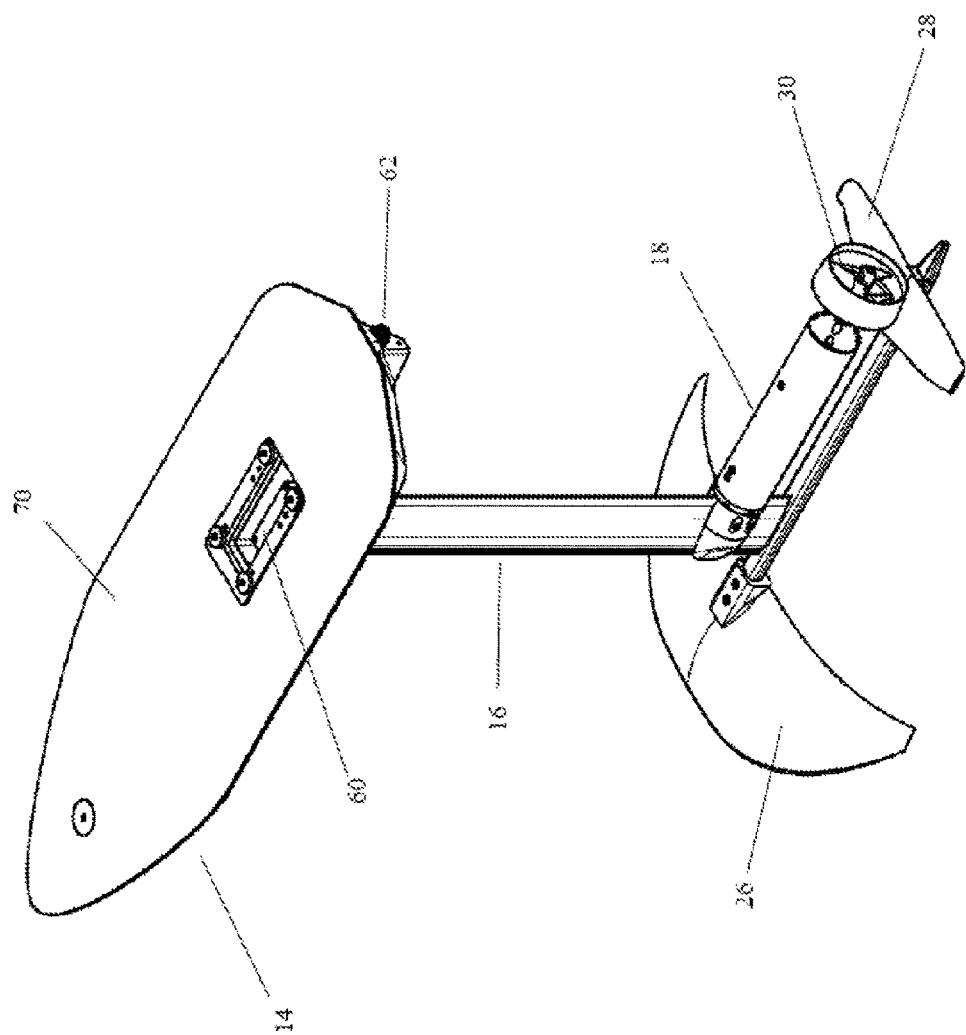
FIG. 13 shows a top perspective view of the housing, mast, motor, propeller and foil.

The housing is also provided with an electrical connector 62 which enables a power cord plugged into connector 62 to thereby recharge the batteries 43. A battery management system 66 is mounted in a compartment 68 and the battery management system 66 is connected by appropriate wiring to the batteries 43 to control recharging and discharging of the batteries 43. In some embodiments, the battery management system 66 is encased in potting compound in the compartment 68 to prevent undesirable contact with water. Similarly, the battery compartment 42 may also be filled with potting compound so that the batteries are encased in the potting compound. This can also result in the top surface 70 of the housing 14 having a smooth, closed top, except for the opening to the sump 46 and the apertures for receiving bolts or screws to mount the housing and mast to the board. This is shown in FIG. 13. It will also be appreciated that a water-tight lid may be positioned on the top of the housing 14 to keep the battery compartment 42 and the battery management system compartment 68 sealed against water ingress.

Figure 10:
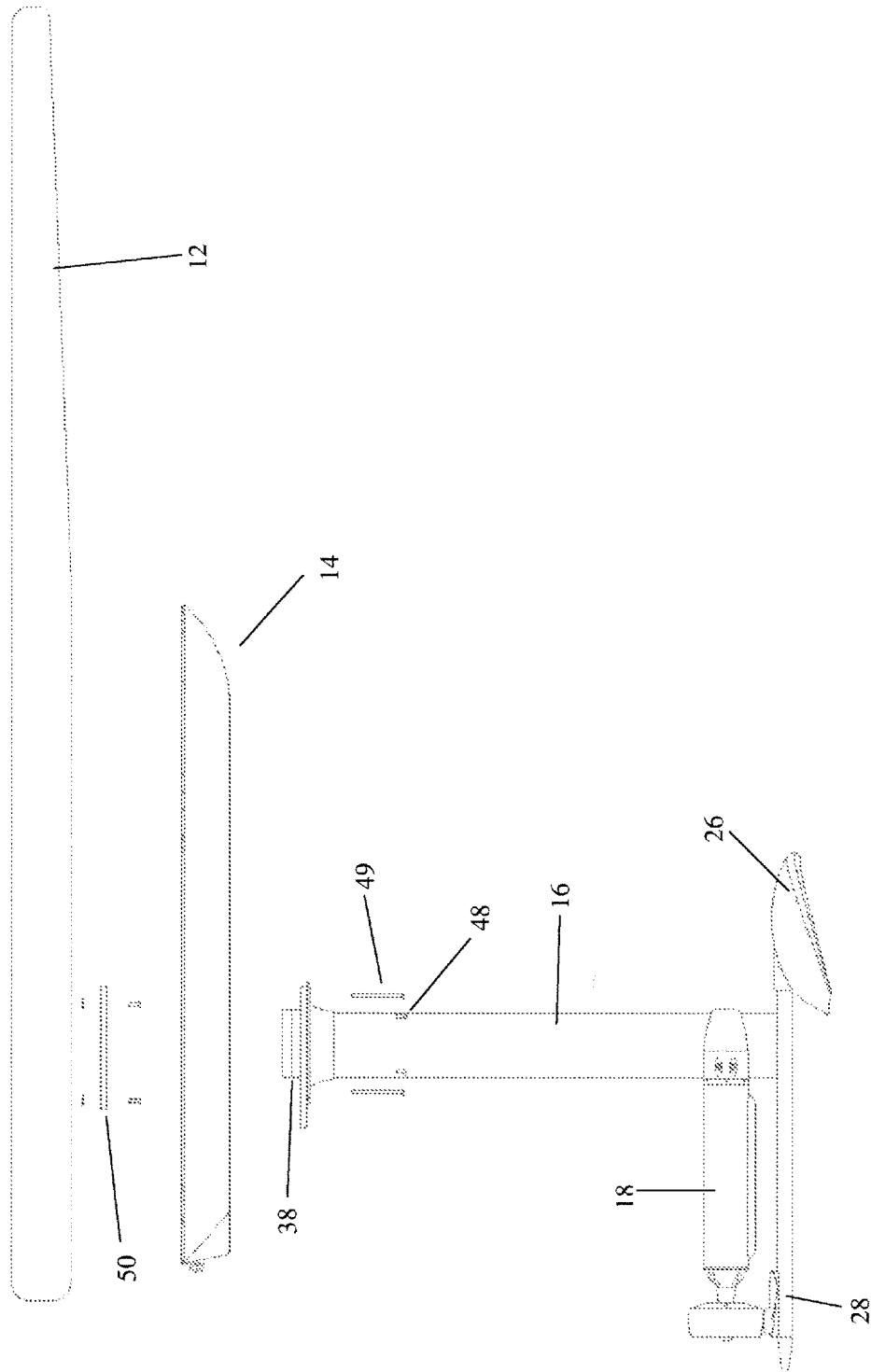
FIG. 10 shows a similar view to that shown in FIG. 9 but from a different angle.
Figure 11:
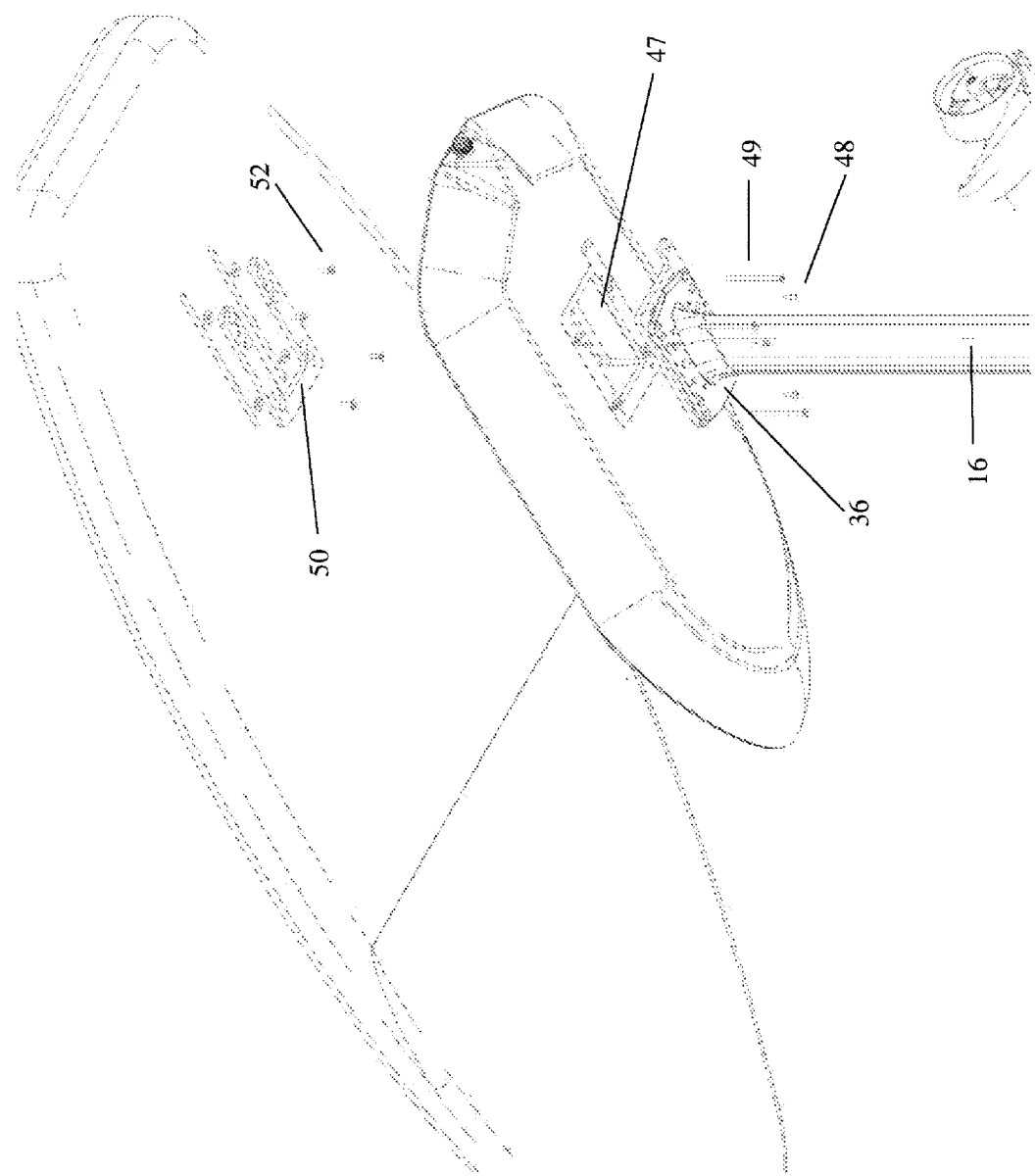
FIG. 11 shows a close-up view of the connection between the mast and the housing and the bracket that is attached to the board.

Returning to FIG. 4, the housing 14 also includes a sump 46 that has an opening 47 (see FIG. 11) that receives the wireless receiver 38. A plurality of apertures is positioned around the opening 47 in the bottom of the housing 14 and the apertures are in general alignment with the apertures 40 in plate 36. Short bolts or self tapping screws 48 are used to connect the plate 36 to the bottom of the housing 14. Some of the apertures enable long bolts or self tapping screws 49 to be passed through the apertures and extend up into corresponding apertures in U-bracket 50. The U bracket 50 is connected to the underside of board 12 using short bolts or self tapping screws 52. Thus, the plate 36 and mast 16 can be connected to the housing using bolts 48 and the housing can be connected to the U bracket and hence to the board 12 using long bolts 49. In this manner, the housing 14 and mast 16 can be retrofitted to existing boards or they can be connected to specially designed boards. Accordingly, housing 14, mast 16 and the other items attached to the mast 16 can form a retrofit kit that can be purchased by existing board owners to convert their board, such as a conventional stand-up paddle board, to a powered hydrofoil board by the simple expedient of bolting the housing 14 to the board 12. The U-bracket 50 assists in bolting the housing 14 to the board 12. As best shown in FIG. 10, the bracket 50 fits into a recess 60 in the housing 14 so that the housing can sit flush with the underside of the board 12.

Figure 12:
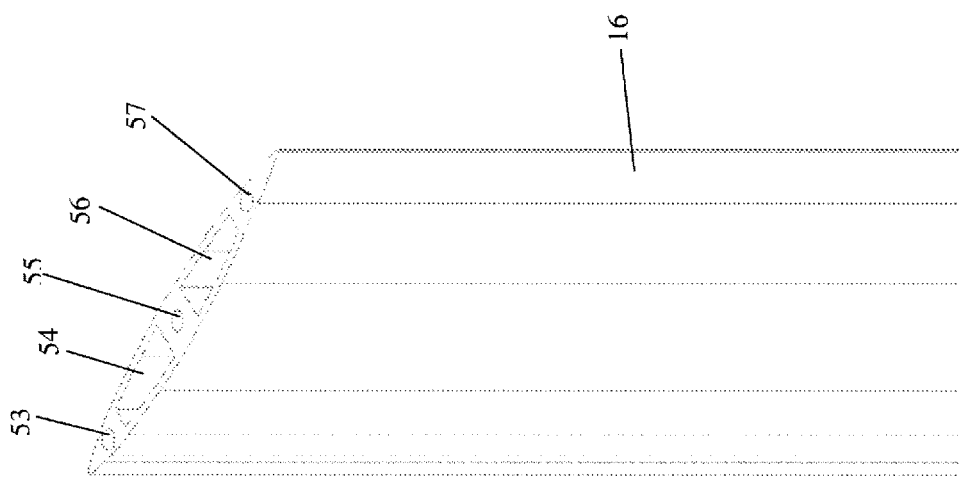
FIG. 12 shows a perspective cross sectional view of the mast.

As best shown in FIG. 12, the mast 16 has a number of cavities, as shown at 53, 54, 55, 56 and 57. The cavities suitably extend along the substantial length of the mast. The cavities reduce the weight of the mast and also provide cavities through which cabling and oil can be supplied from the housing 14 to the thruster tube 18.

Figure 8:
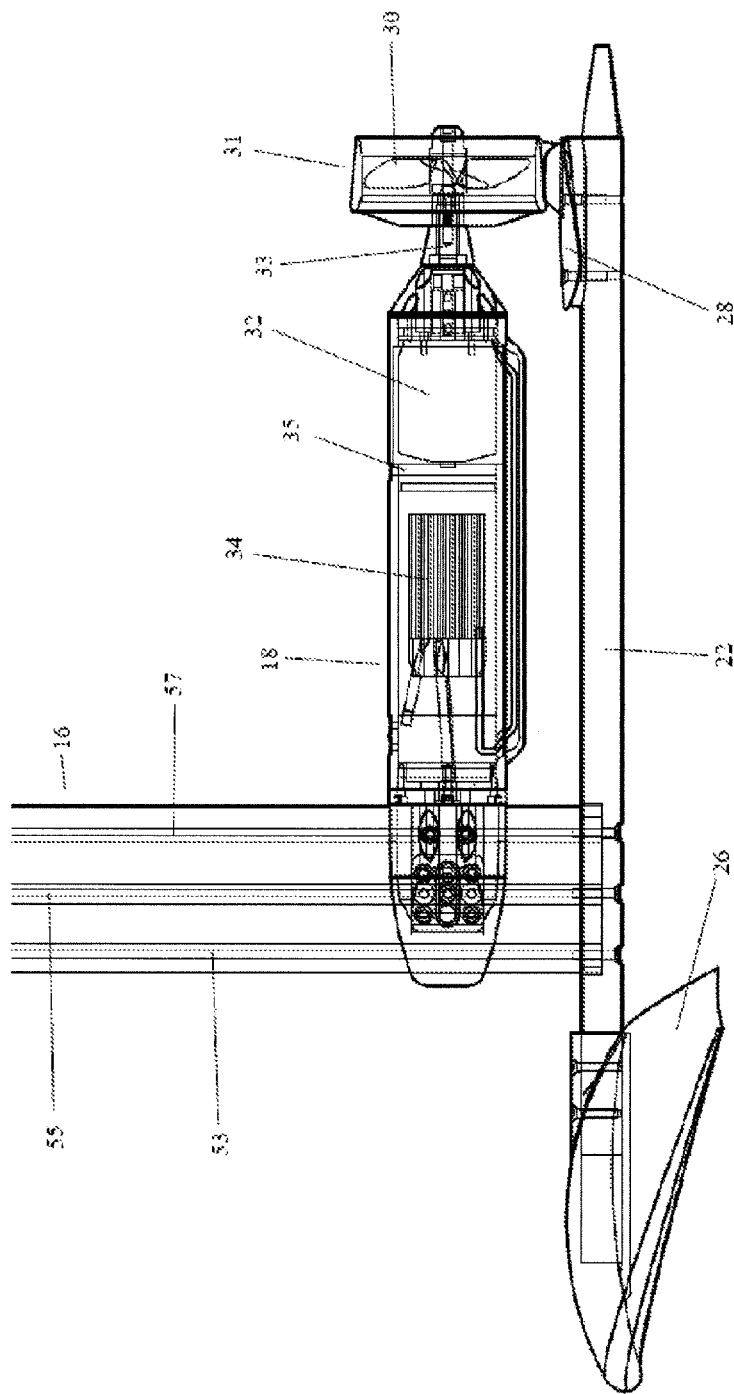
FIG. 8 shows a side view partly in cross-section of the thrust tube and motor being connected to the mast and the hydrofoil part also be connected to the mast.
Figure 9:
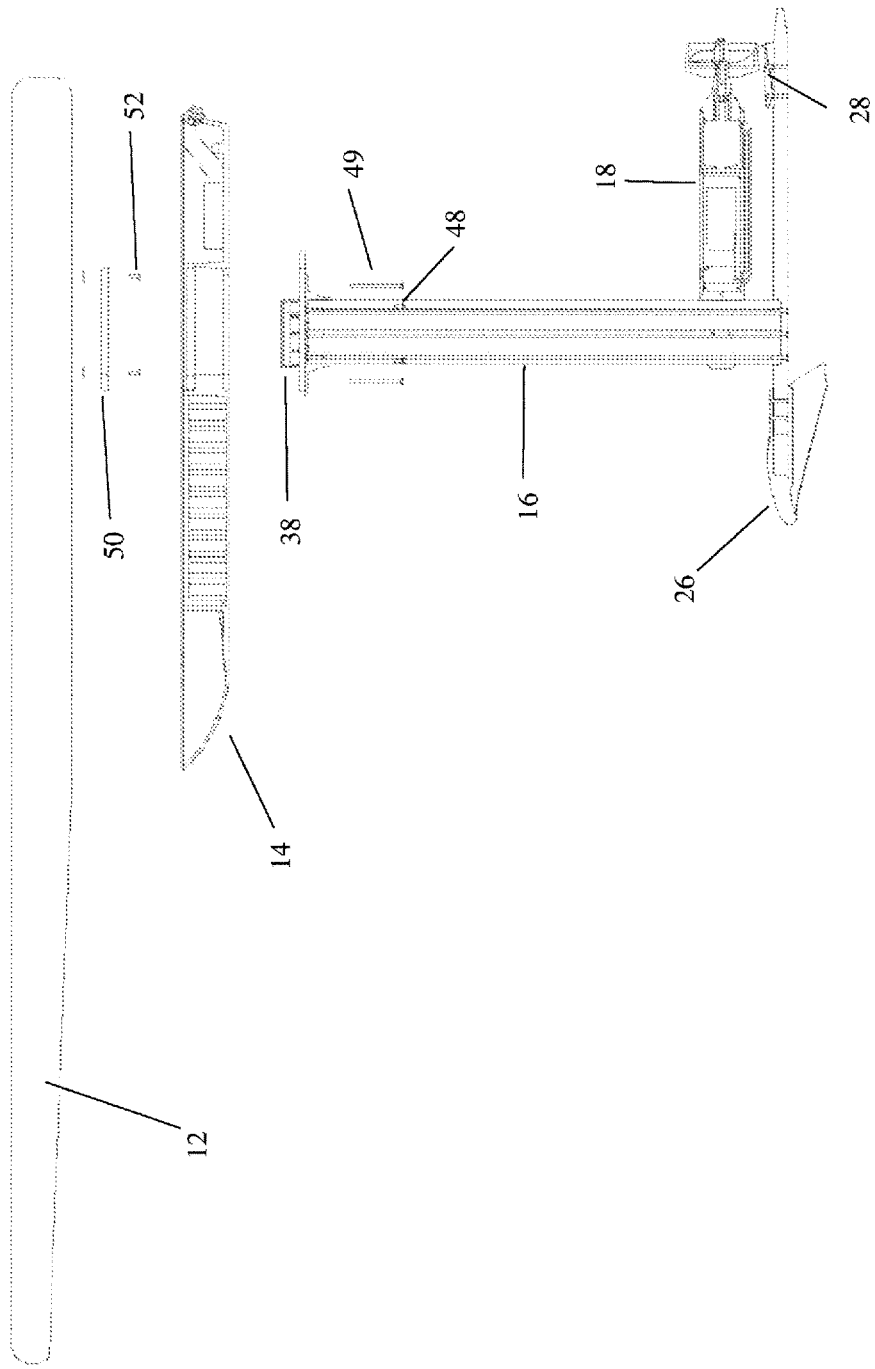
FIG. 9 shows a perspective view of the apparatus shown in FIG. 1, but being apart and in line for assembly.

Turning now to FIG. 8, which shows a close-up view of the bottom of the mast to show greater detail of the foil and the thruster tube, the forward end 19 of the thruster tube 18 is connected by bolts 58 to the mast 16. A fluid passage is provided between cavity 55 and the inner volume of thruster tube 18. Similarly, a fluid passage is provided between cavity 57 in mast 16 in the inner volume of thruster tube 18. In this manner, oil can flow from sump 46 into the inner volume of thruster tube 18 and oil can flow from the cavity 57 to the inner volume of thruster tube 18, when the oil is being added to the sump. This enables oil to be in fluid communication between the sump 46 and the thruster tube 18. Thruster tube 18 is also provided with a first passage 59 which provides fluid communication from the front part of thruster tube 18 to the motor 32 at the rear part of thruster tube 18. Similarly, passage 60 also provides fluid communication between the rear part of thruster tube 18 and the front part of thruster tube 18 and the coolant passages in motor controller 34. This conduit also carries motor wiring, which includes 3 large gauge phase wires that form the electrical connection between the motor controller and the motor. These wires also need to be cooled. In this manner, the hydrostatic head of pressure arising from the oil in the sump can be transferred to the motor section of the thruster tube. In this regard, it will be understood that the oil provided from the sump 46, which is located in the housing 14, to the rear part of the thruster tube 32 has a hydraulic head of pressure that will assist in preventing or reducing ingress of water passed the seal around the propeller shaft 33. In this regard, when the board is hydrofoiling, the sump is raised above the water level and therefore the head of oil is greater than the water pressure at the thruster tube.

A bulkhead 35 that seals off the motor controller 34 from the compartment of the tube that houses the motor 32. In one embodiment of the present invention, the motor controller 34 is inserted into the empty motor controller compartment of the tube 18 so that it butts up against the bulkhead 35. The potting compound can then be poured into the motor controller compartment and around the motor controller 34 and allowed to set. This firmly mounts the motor controller 34 in the thruster tube 18 and also establishes good thermal contact between the motor controller 34 and the wall of the thruster tube 18.

In use of the watercraft shown in the attached drawings, as the watercraft travels through the water, it will reach a threshold speed where the hydrodynamic lift provided by the lifting foil 26 becomes greater than the weight of the craft and the rider. This will cause the board to rise out of the water and it will continue to travel in a hydrofoiling mode. Heat that is generated by the motor controller 34 is transferred through the potting compound to the walls of the thruster tube 18. As the thruster tube 18 is travelling through the water at relatively high velocity, good heat transfer is achieved between the thruster tube 18 and the water. This acts to cool the motor controller and to dissipate heat generated by the motor controller. Additionally, the oil flowing from the sump to the thruster tube and back up to the sump must pass through the mast 16. This oil is also cooled by the water as it travels through the mast and through the thruster tube. Accordingly, efficient cooling of the motor controller and the motor is obtained.

Further, the apparatus shown in the attached drawings can be provided as a kit or an assembly that can be easily attached to existing boards, such as conventional stand-up paddle boards or conventional windsurfer boards. As a result, the apparatus can be retrofitted to existing conventional boards to convert those boards to a powered hydrofoil watercraft. Should the owner of the board wish to use that board as a stand-up paddle board or as a windsurfer board, the apparatus can be readily removed from the board and the conventional fin arrangements of the board be replaced onto the board. Further, the apparatus can be readily removed from the board to enable maintenance or battery replacement to take place.

The housing is also provided with an electrical connector 62 which enables a power cord plugged into connector 62 to thereby recharge the batteries 43. A battery management system 66 is mounted in receptacle 68 and the battery management system 66 is connected by appropriate wiring to the batteries 43 to control recharging and discharging of the batteries 43. In some embodiments, the battery management system 66 is encased in potting compound in the receptacle 68 to prevent undesirable contact with water.

Figure 14:
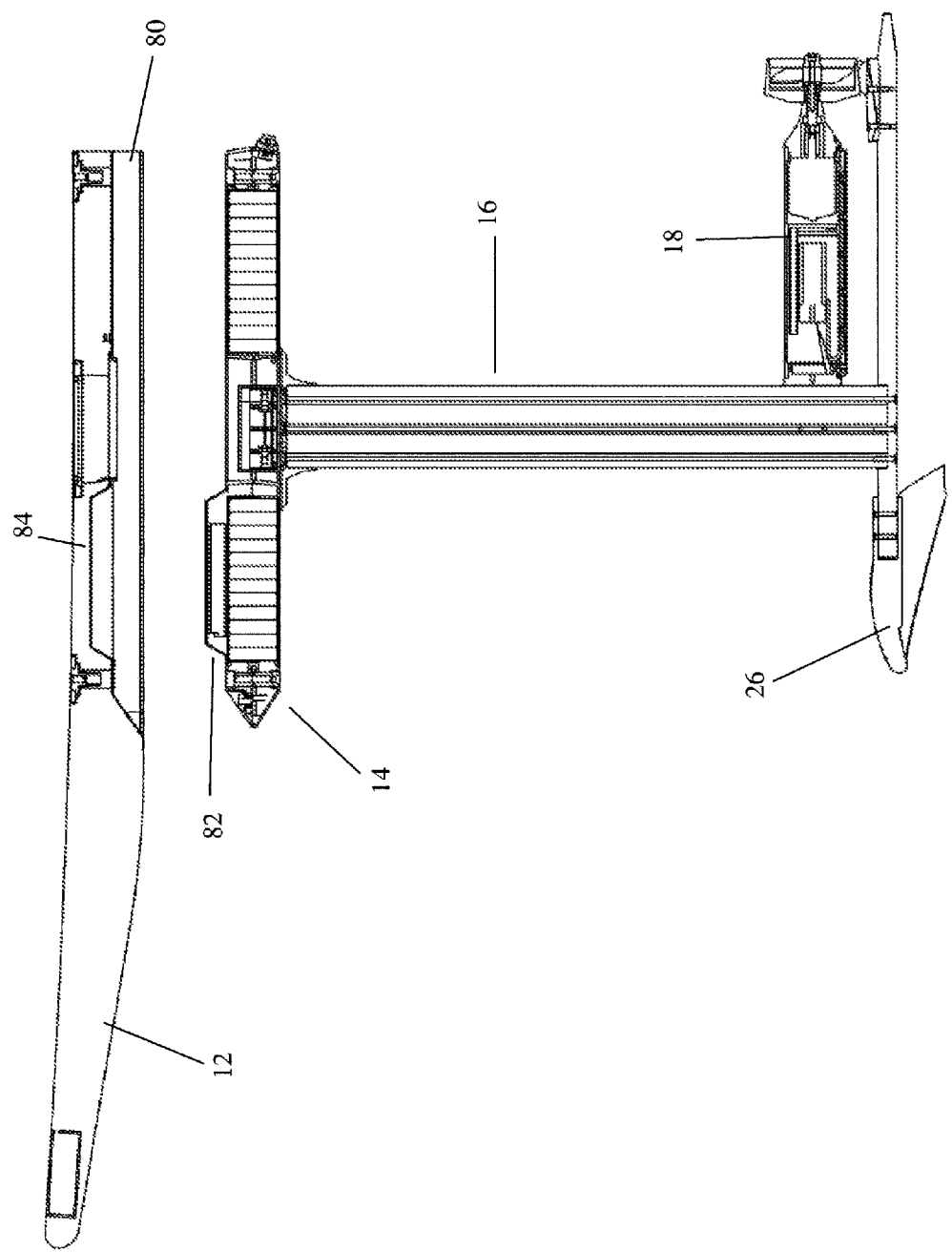
FIG. 14 shows a side view of another embodiment of the present invention in which the housing is connected to a recess in the lower surface of the board.
Figure 15:
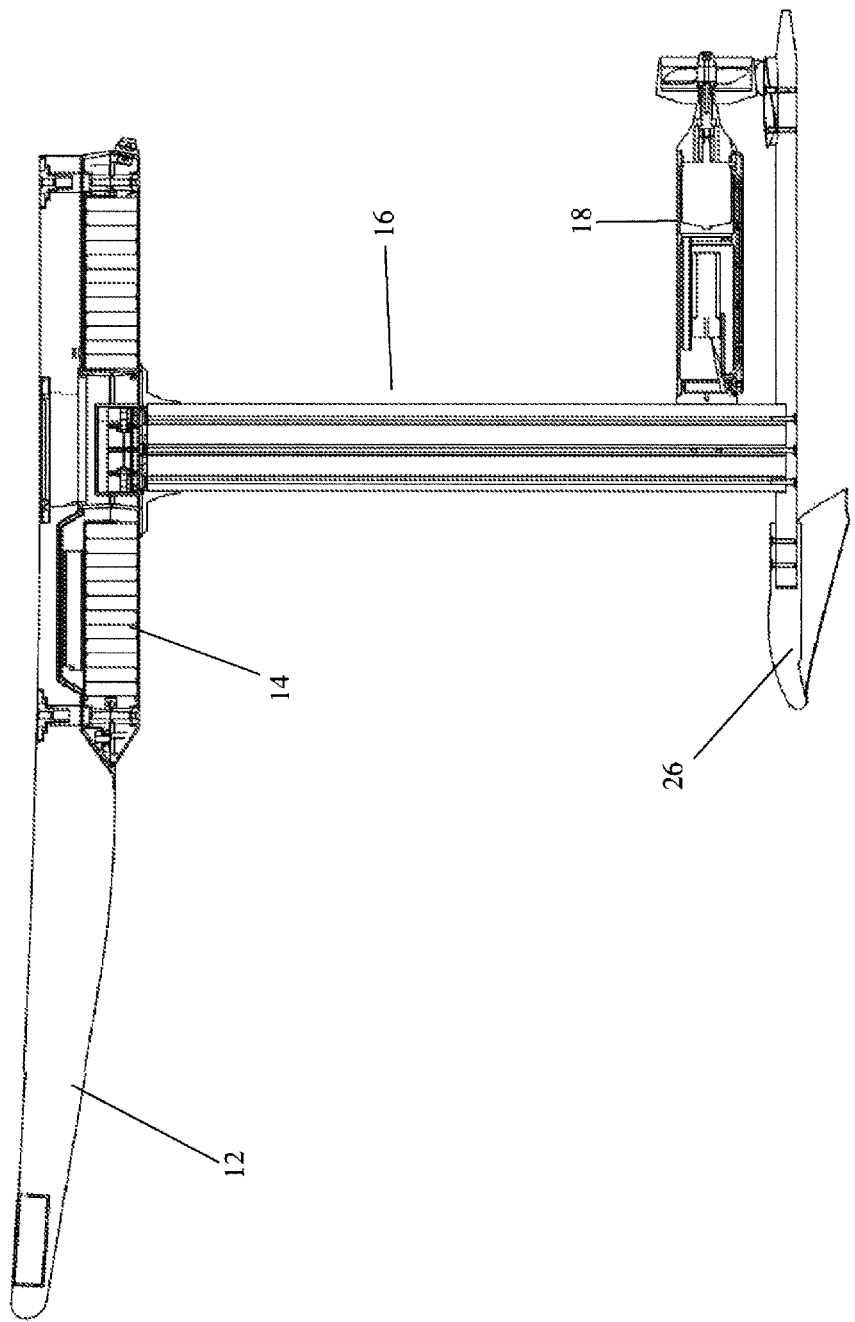
FIG. 15 shows a side view that is similar to that shown in FIG. 14 but with the housing connected to the board.

FIGS. 14 and 15 show side views of another embodiment of the present invention. The embodiment shown in FIGS. 14 and 15 is similar to the embodiments shown in FIGS. 1 to 13 and, for convenience and brevity of description, like reference numerals will be used to denote like features. In the embodiments of FIGS. 14 and 15, the board 12 is provided with a recessed region 80 formed in a lower surface of the board 12. The recessed region 80 has a shape that is complementary to the shape of an upper surface 82 of the housing 14. The recessed region 80 may be formed by moulding the board in that shape or by forming a cutout in the board. As can be seen in FIG. 15, when the housing 14 is connected to the board 12, the top surface 82 of the housing abuts the top surface 84 of the recessed region and the lower surface of the housing 14 extends below the lower external surface 86 of the board 12. It will be appreciated that the housing may be shaped such that the lower surface of the housing 14 sits flush with the lower external surface 86 of the board 12.

In the embodiment shown in FIGS. 14 and 15, the batteries are located below the top surface of the board 12. Further, the housing 14, which includes the batteries, is located at least partly within the board 12 to thereby provide a structural member or structural strength to the board 12.

In another embodiment that is similar to that shown in FIGS. 14 and 15, the housing may form an integral part of the board and not be separate to the board. Alternatively, all of the workings within the housing may be housed within the board.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A watercraft comprising a board, a mast extending below the board, the mast carrying a foil and a propeller that is driven by a motor, a lubricant lubricating the motor and/or a drive shaft associated with the motor for driving the propeller, the watercraft having a receptacle for holding lubricant, the receptacle being located above the motor, wherein the mast has a conduit that provides fluid communication between the receptacle and the lubricant lubricating the motor and/or driveshaft such that lubricant in the receptacle provides a hydrostatic head of pressure to prevent or minimise water ingress around a propeller seal or a driveshaft seal located adjacent a region where the driveshaft exits into the water.

2. A watercraft as claimed in claim 1 wherein the foil comprises a lifting foil and a stabilising foil.

3. A watercraft as claimed in claim 1 wherein the mast has one or more conduits through which cables and/or wires can pass and through which oil can pass.

4. A watercraft as claimed in claim 1 wherein the motor is carried in a tube connected to or extending from the mast, wherein a motor controller is also positioned within the tube.

5. A watercraft as claimed in claim 4 wherein heat generated by the motor controller during use of the watercraft is transferred to the tube and is dissipated into the water through which the watercraft is travelling.

6. A watercraft as claimed in claim 4 wherein the tube comprises a thruster tube having a propeller attached at one end and the thruster tube being connected to the mast at another end, the motor being mounted in the thruster tube close to a propeller end the motor controller being mounted in the thruster tube between the motor and the mast.

7. A watercraft as claimed in claim 4 wherein the motor controller is encased in a thermally conductive material and the thermally conductive material is in contact with an inner wall of the tube.

8. A watercraft as claimed in claim 7 wherein the thermally conductive material comprises a thermally conductive polymer or a thermally conductive potting compound.

9. A watercraft as claimed in claim 7 wherein the motor controller is encased in the thermally conductive material and the thermally conductive material is shaped such that it fits inside the tube and a watertight seal is formed between the walls of the tube and the thermally conductive material.

10. A watercraft as claimed in claim 4 wherein one or more electrical or data leads or cables extend from the motor controller up through the mast.

11. A watercraft as claimed in claim 10 wherein the one or more electrical or data leads or cables are connected either by wires or wirelessly to a control unit operated by the user of the watercraft such that control signals from the control unit operated by the user can be transferred through the one or more electrical or data leads or cables extending through the mast to the motor controller.

12. A watercraft as claimed in claim 1 wherein the mast is connected to the board or the mast is connected to a housing and the housing is connected to the board.

13. A watercraft as claimed in claim 12 wherein the housing is connected to an underside of the board and the housing houses one or more batteries.

14. A watercraft as claimed in claim 13 wherein the housing has a seal between itself and the board when the housing is connected to the board and the housing comprises a watertight housing having a base, sidewalls and a top.

15. A watercraft as claimed in claim 12 wherein the board has a recessed region in a lower surface and the housing is connected to the board in the recessed region.

16. A watercraft as claimed in claim 15 wherein the housing has a lower surface that follows a line of a lower external surface of the board, such that the lower surface of the housing is essentially flush with a lower external surface of the board when the housing is connected to the board.

17. A watercraft as claimed in claim 1 wherein the watercraft includes at least one battery, the at least one battery being recessed into the board.

18. A watercraft as claimed in claim 17 wherein the at least one battery is positioned in a recessed region in a lower surface of the board.

19. A watercraft as claimed in claim 12 wherein the motor is supplied with oil from a sump located towards the top of the housing or at or above the top of the housing, and oil in the sump travels down a first conduit in the mast to the thruster tube and travels up a second conduit in the mast back to the sump.

20. A watercraft as claimed in claim 19 wherein the oil in the sump and mast is in fluid communication with the oil in the motor section to provide a hydrostatic head of oil to prevent or minimise water ingress around a propeller seal.

* * * * *